(12) United States Patent
Kim et al.

(10) Patent No.: US 10,199,691 B2
(45) Date of Patent: Feb. 5, 2019

(54) ELECTRODE ASSEMBLY, LITHIUM BATTERY INCLUDING THE SAME, AND METHOD OF MANUFACTURING THE ELECTRODE ASSEMBLY

(71) Applicant: SAMSUNG SDI CO., LTD., Yongin-si, Gyeonggi-do (KR)

(72) Inventors: DuckHyun Kim, Yongin-si (KR); HeeEun Yoo, Yongin-si (KR); TaeRi Kwon, Yongin-si (KR); TaeHyun Bae, Yongin-si (KR); SiYoung Cha, Yongin-si (KR); MinJu Lee, Yongin-si (KR); ILKyoung Kwon, Yongin-si (KR); WooCheol Shin, Yongin-si (KR)

(73) Assignee: Samsung SDI Co., Ltd., Yongin-Si, Gyeonggi-do (KR)

( * ) Notice: Subject to any disclaimer, the term of this patent is extended or adjusted under 35 U.S.C. 154(b) by 0 days.

(21) Appl. No.: 15/432,308

(22) Filed: Feb. 14, 2017

(65) Prior Publication Data
US 2017/0250446 A1     Aug. 31, 2017

(30) Foreign Application Priority Data
Feb. 25, 2016    (KR) ........................ 10-2016-0022827

(51) Int. Cl.
| | |
|---|---|
| H01M 2/00 | (2006.01) |
| H01M 10/0585 | (2010.01) |
| H01M 2/16 | (2006.01) |
| H01M 10/0525 | (2010.01) |
| H01M 10/056 | (2010.01) |
| H01M 4/13 | (2010.01) |

(52) U.S. Cl.
CPC ..... *H01M 10/0585* (2013.01); *H01M 2/1673* (2013.01); *H01M 4/13* (2013.01); *H01M 10/056* (2013.01); *H01M 10/0525* (2013.01)

(58) Field of Classification Search
CPC .. H01M 4/13; H01M 2/1673; H01M 10/0525; H01M 10/0585
See application file for complete search history.

(56) References Cited

U.S. PATENT DOCUMENTS

| | | |
|---|---|---|
| 6,870,728 B1 | 3/2005 | Burket et al. |
| 9,123,948 B2 | 9/2015 | Kim |

(Continued)

FOREIGN PATENT DOCUMENTS

| | | |
|---|---|---|
| JP | 4734940 B2 | 7/2011 |
| JP | 2012-022893 A | 2/2012 |
| KR | 10-2012-0081783 A | 7/2012 |

*Primary Examiner* — Cynthia H Kelly
*Assistant Examiner* — Monique M Wills
(74) *Attorney, Agent, or Firm* — Lee & Morse, P.C.

(57) ABSTRACT

An electrode assembly includes a first electrode at an upper part, a second electrode at a lower part, and an electrolyte membrane between the first electrode and the second electrode. Each of the first electrode and the second electrode includes an electrode active material layer, a tab portion, and a non-coated portion, the non-coated portion being located at at least one lateral side of the first electrode or the second electrode, and the non-coated portion of at least one of the first electrode and the second electrode includes at least one groove that is parallel to a thickness direction of the first electrode or the second electrode.

20 Claims, 5 Drawing Sheets

(56) References Cited

U.S. PATENT DOCUMENTS

| | | | |
|---|---|---|---|
| 2009/0117462 A1* | 5/2009 | Okazaki | H01M 4/04 429/218.1 |
| 2009/0246636 A1* | 10/2009 | Chiang | H01M 2/166 429/231.95 |
| 2015/0140400 A1* | 5/2015 | Yamazaki | H01M 10/0585 429/136 |
| 2017/0250404 A1* | 8/2017 | Cho | H01M 4/366 |

* cited by examiner (COMPARATIVE EMBODIMENT)

ELECTRODE ASSEMBLY, LITHIUM BATTERY INCLUDING THE SAME, AND METHOD OF MANUFACTURING THE ELECTRODE ASSEMBLY

CROSS-REFERENCE TO RELATED APPLICATION

Korean Patent Application No. 10-2016-0022827, filed on Feb. 25, 2016, in the Korean Intellectual Property Office, and entitled: "Electrode Assembly, Lithium Battery Including the Same, and Method of Manufacturing the Electrode Assembly," is incorporated by reference herein in its entirety.

BACKGROUND

1. Field

One or more embodiments relate to an electrode assembly, a lithium battery including the electrode assembly, and a method of manufacturing the electrode assembly.

2. Description of the Related Art

Among secondary batteries, lithium secondary batteries are widely used in small-sized high-technology electronic devices, such as mobile devices and laptop computers. Also mid-sized to large-sized batteries have been developed, and the development of electrochemically stable lithium secondary batteries having high capacity is in progress particularly due to the wide use of electric vehicles (EVs).

SUMMARY

Embodiments are directed to an electrode assembly including a first electrode at an upper part, a second electrode at a lower part, and an electrolyte membrane between the first electrode and the second electrode. Each of the first electrode and the second electrode includes an electrode active material layer, a tab portion, and a non-coated portion, the non-coated portion being located at at least one lateral side of the first electrode or the second electrode, and the non-coated portion of at least one of the first electrode and the second electrode includes at least one groove that is parallel to a thickness direction of the first electrode or the second electrode.

A cross-section of the groove may be a rectangle.

A cross-sectional area of the groove may occupy about 0.1% to about 20% of the total area of the first electrode or the second electrode.

The at least one groove may be present in a range of 1 to 6 grooves per 600 mm unit length of the at least one lateral side.

A width of the groove may be in a range of about 0.1 mm to about 10 mm.

The first electrode and the second electrode may each have a rectangular shape that includes a short-side edge and a long-side edge. The second electrode may include the non-coated portion, the non-coating portion including at least two grooves in each of the short-side edge and the long-side edge.

The groove may have a structure resulting from being formed by a punching process.

The tab portion may include a non-coated portion comprising grooves.

The electrolyte membrane may be an organic-inorganic hybrid electrolyte membrane.

The organic-inorganic hybrid electrolyte membrane may include a polymer and a lithium ion conductive inorganic material.

The polymer may be at least one selected from polyethyleneoxide (PEO), polypropyleneoxide (PPO), polybutyleneoxide (PBO), polysiloxane, polyethyleneglycol (PEG), polypropyleneglycol (PPG), PEO grafted polymethylmethacrylate (PEO grafted PMMA), PPO grafted PMMA, PBO grafted PMMA, polysiloxane grafted PMMA, PEG grafted PMMA, PPG grafted PMMA, a diblock copolymer of PEO and polystyrene, a triblock copolymer of PEO, polystyrene, and PEO, a triblock copolymer of polystyrene, PEO, and polystyrene, cross-linked PEO, acrylate-based cross-linked PEO, urea-based cross-linked PEO, and urethane-based cross-linked PEO.

The lithium ion conductive inorganic material may include a garnet oxide.

The garnet oxide may be represented by Formula 1:

$$L_{5+x+2y}(D_yE_{3-y})(Me_zM_{2-z})O_d \qquad \text{<Formula 1>}$$

wherein, in Formula 1, L is one or more selected from Li, Na, Mg, Ca, K, and H; D is K, Rb, or Cs; E is La; Me is one or more selected from Ta, Nb, Y, Sc, W, Mo, Sb, Bi, Hf, V, Ge, Si, Al, Ga, Ti, Co, In, Zn, and Cr; M is Zr, Ta, Bi, Sb, or Nb; $0<x+2y\leq 3$, $0\leq y\leq 0.5$, $0\leq z<2$, and $0\leq d\leq 12$; and some or all oxygens are substitutable with one or more selected from pentavalent, hexavalent, and heptavalent anions.

The organic-inorganic hybrid electrolyte membrane may further include a lithium salt.

The lithium salt may include at least one selected from LiSCN, $LiN(CN)_2$, $LiClO_4$, $LiBF_4$, $LiAsF_6$, $LiPF_6$, $LiCF_3SO_3$, $Li(CF_3SO_2)_2N$, $Li(CF_3SO_2)_3C$, $LiN(SO_2F)_2$, $LiN(SO_2CF_3)_2$, $LiN(SO_2C_2F_5)_2$, $LiSbF_6$, $LiPF_3(CF_2CF_3)_3$, $LiPF_3(CF_3)_3$, and $LiB(C_2O_4)_2$.

The electrode assembly may be a stack-type electrode assembly.

Embodiments are also directed to a lithium battery including the electrode assembly as described above.

Embodiments are also directed to a method of manufacturing an electrode assembly, including performing a punching process on at least one lateral side of a second electrode substrate having a second electrode active material layer by using a mold for forming at least one groove, to prepare a second electrode having the at least one groove; coating and drying a composition for forming an electrolyte membrane on the second electrode to provide an electrolyte membrane; and stacking a first electrode having a first electrode active material layer on the second electrode having the electrolyte membrane and performing a cutting process on a connection site of the stack to prepare the electrode assembly described above.

The composition for forming an electrolyte membrane may be a mixture that includes a solvent, a polymer, and a lithium ion conductive inorganic material.

A mixing weight ratio of the polymer and the lithium ion conductive inorganic material is in a range of about 97:3 to about 30:70.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
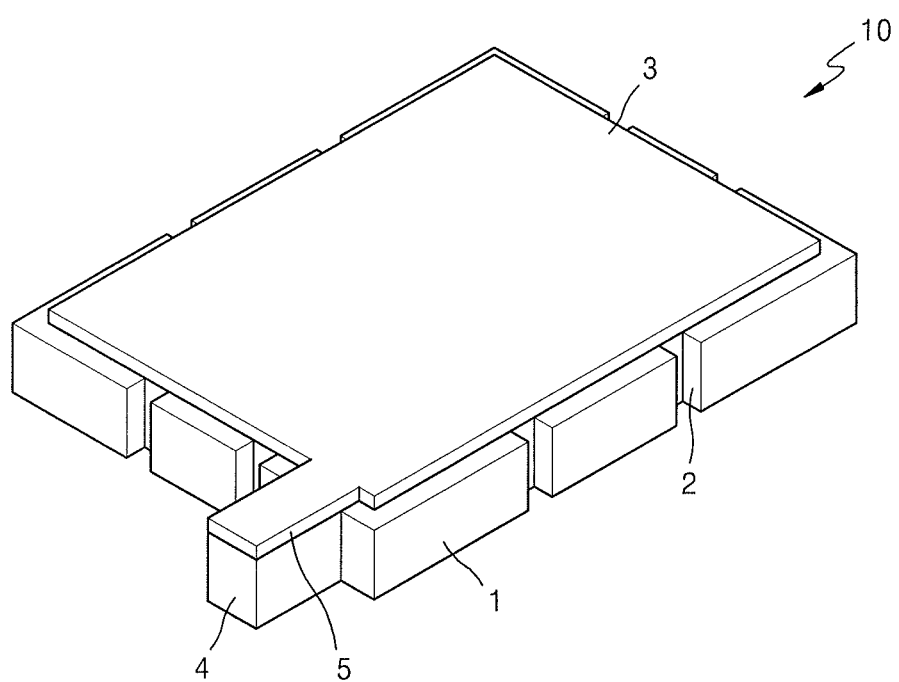
FIG. 1 illustrates a perspective view of an electrode structure of an electrode assembly according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art. In the drawing figures, the dimensions of layers and regions may be exaggerated for clarity of illustration.

As used herein, the terms "a first electrode" and "a second electrode" are electrodes of the opposite poles from each other which may refer to a positive electrode or a negative electrode. For example, when the "first electrode" is a positive electrode, the "second electrode" may be a negative electrode.

As used herein, the term "a non-coated portion" refers to an electrode substrate portion on which an electrode active material layer is not coated. As used herein, the term "an electrode substrate" or "electrode substrate surface" denotes "an electrode current collector" or "an electrode current collector surface", respectively.

FIG. 1 illustrates a perspective view of an electrode structure of an electrode assembly 10 according to an embodiment.

As shown in FIG. 1, the electrode 10 may include an electrode active material layer, a tab portion 4, and a non-coated portion 1 including two grooves 2 in each of four lateral sides. An electrolyte membrane 3 including a tab portion 5 may be disposed on the electrode active material layer. (In FIG. 1, the electrode active material layer is hidden from view by the electrolyte membrane 3.) A cross-section of the groove 2 may be a rectangle. The electrode 10 may be, for example, a second electrode. The second electrode may be a negative electrode.

Figure 2:
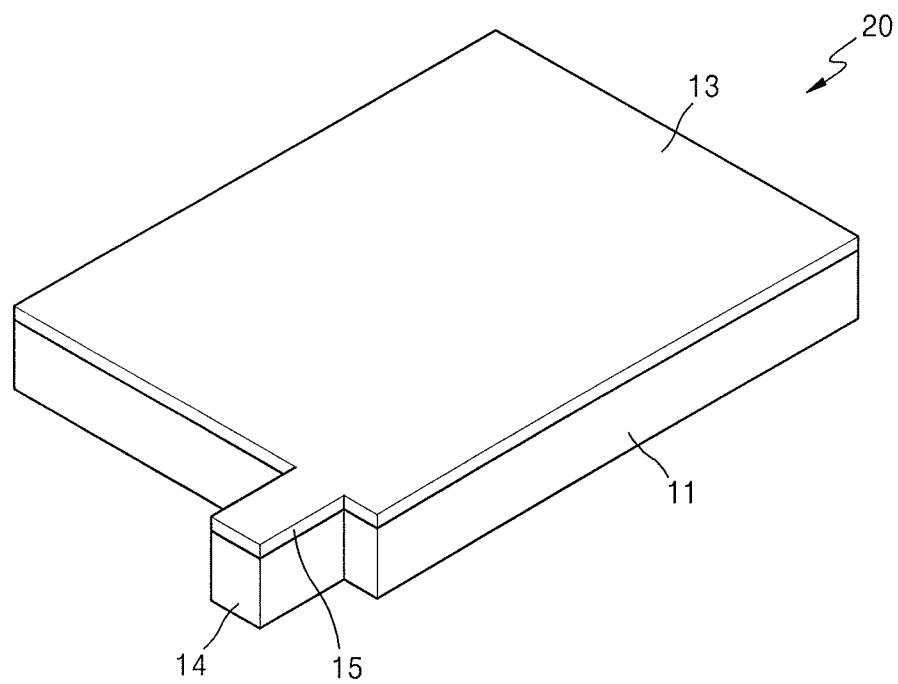
FIG. 2 illustrates a perspective view of an electrode structure of an electrode assembly according to a comparative embodiment.

FIG. 2 illustrates a perspective view of an electrode structure of an electrode assembly 20 according to a comparative embodiment.

As shown in FIG. 2, the electrode assembly 20 may include an electrode active material layer, a tab portion 14, and a non-coated portion, wherein an electrolyte membrane 13 including a tab portion 15 is disposed on the electrode active material layer. The electrode 20 may be, for example, a second electrode. The second electrode may be a negative electrode.

Unlike the electrode assembly according to a comparative embodiment, shorts may be prevented in the electrode assembly according to an embodiment by having the non-coated portion including at least one groove portion 2 that is formed parallel to a thickness direction of the electrode assembly 10 so that a substrate surface of the electrode assembly 10 other than the grooves 2 is not exposed. Therefore, electrical stability of a lithium battery including the electrode assembly according to an embodiment may be improved.

A cross-sectional area of the groove 2 may occupy about 0.1% to about 20% of the total area of the first electrode or the second electrode. For example, a cross-sectional area of the groove may occupy about 0.1% to about 10%, or, for example, about 5% to about 20%, of the total area of the first electrode or the second electrode.

The number of the grooves 2 may be in a range of 1 to 6 grooves per a 600 mm unit length of the lateral side. For example, the number of the grooves 2 may be in a range of 2 to 3 grooves per a 30 mm unit length of the lateral side.

A width of the groove 2 may be in a range of about 0.1 mm to about 10 mm. For example, a width of the groove 2 may be in a range of about 0.5 mm to about 2 mm, or, for example, about 1 mm to about 2 mm.

When the cross-sectional area, the number, and the width of the grooves 2 are within these ranges, the lithium battery may secure a high capacity and have improved electrical stability.

A shape of each of the first electrode and the second electrode may be a rectangle having short-side edges and long-side edges. The second electrode may include a non-coated portion including at least two grooves included in each of the short-side edges and the long-side edges. The electrode structure may contribute to a high capacity and may provide improved electrical stability by minimizing a non-reacting area where intercalation/deintercalation of lithium ions does not occur.

The groove 2 may be formed by a punching process. The term "punching process" generally refers to processing an electrode plate by using a mold having a shape of an electrode plate with an electrode active material layer.

As used herein, the term "punching process" refers to processing an electrode plate by using a mold for forming at least one groove in at least one lateral side of a first electrode substrate having a first electrode active material layer or/and a second electrode substrate having a second electrode active material layer.

The tab portion 4 may include a non-coated portion constitute of a groove.

The electrolyte membrane 3 in the electrode assembly 10 may be an organic-inorganic hybrid electrolyte membrane. The electrolyte membrane 3 may replace a separator.

The organic-inorganic hybrid electrolyte membrane may include a polymer and a lithium ion conductive inorganic material. The organic-inorganic hybrid electrolyte membrane may have a high lithium ion conductivity, a high chemical stability, and a broad potential window. In this regard, a capacity and an energy density of the lithium battery including the electrolyte membrane 3 may be increased, and an electrochemical stability may be secured.

The polymer may be at least one selected from polyethyleneoxide (PEO), polypropyleneoxide (PPO), polybutyleneoxide (PBO), polysiloxane, polyethyleneglycol (PEG), polypropyleneglycol (PPG), PEO grafted polymethylmethacrylate (PEO grafted PMMA), PPO grafted PMMA, PBO grafted PMMA, polysiloxane grafted PMMA, PEG grafted PMMA, PPG grafted PMMA, a diblock copolymer of PEO and polystyrene, a triblock copolymer of PEO, polystyrene, and PEO, a triblock copolymer of polystyrene, PEO, and polystyrene, cross-linked PEO, acrylate-based cross-linked PEO, urea-based cross-linked PEO, and urethane-based cross-linked PEO.

For example, the polymer may be at least one selected from PEO, PPO, PBO, polysiloxane, PEG, PPG, PEO grafted PMMA, PPO grafted PMMA, PBO grafted PMMA, polysiloxane grafted PMMA, PEG grafted PMMA, and PPG grafted PMMA.

For example, the polymer may be at least one selected from PEO, PPO, PBO, polysiloxane, PEG, and PPG. The polymer may have excellent lithium ion conductivity.

The lithium ion conductive inorganic material may include a garnet-type oxide.

The garnet-type oxide may be represented by Formula 1:

  <Formula 1>

$$L_{5+x+2y}(D_y,E_{3-y})(Me_2,M_{2-z})O_d$$

In Formula 1,

L may be one or more selected from Li, Na, Mg, Ca, K, and H;

D may be K, Rb, or Cs;

E may be La;

Me may be one or more selected from Ta, Nb, Y, Sc, W, Mo, Sb, Bi, Hf, V, Ge, Si, Al, Ga, Ti, Co, In, Zn, and Cr;

M may be Zr, Ta, Bi, Sb, or Nb;

$0<x+2y\leq 3$, $0\leq y\leq 0.5$, $0\leq z<2$, and $0<d\leq 12$; and some or all oxygens are substitutable with one or more selected from pentavalent, hexavalent, and heptavalent anions.

For example, the garnet-type oxide may be $Li_7La_3Zr_2O_{12}$.

In the garnet-type oxide, when at least some of trivalent cations existing in a dodecahedral site are substituted with monovalent cations having a larger ionic radius, a lattice parameter increases, and an activation energy decreases. Also, when monovalent cations having a lower electronegativity are substituted, distances between oxygen ions around lithium ions existing in a tetrahedral site and/or an octahedral site may change. As a result, movement of lithium ions may be facilitated.

The organic-inorganic hybrid electrolyte membrane may further include a lithium salt.

The lithium salt may include at least one selected from LiSCN, $LiN(CN)_2$, $LiClO_4$, $LiBF_4$, $LiAsF_6$, $LiPF_6$, $LiCF_3SO_3$, $Li(CF_3SO_2)_2N$, $Li(CF_3SO_2)_3C$, $LiN(SO_2F)_2$, $LiN(SO_2CF_3)_2$, $LiN(SO_2CF_2CF_3)_2$, $LiSbF_6$, $LiPF_3(CF_2CF_3)_3$, $LiPF_3(CF_3)_3$, and $LiB(C_2O_4)_2$.

The lithium salt may improve lithium ion mobility and ion conductivity in the organic-inorganic hybrid electrolyte membrane.

The electrode assembly may be a stack-type electrode assembly.

Figure 4:
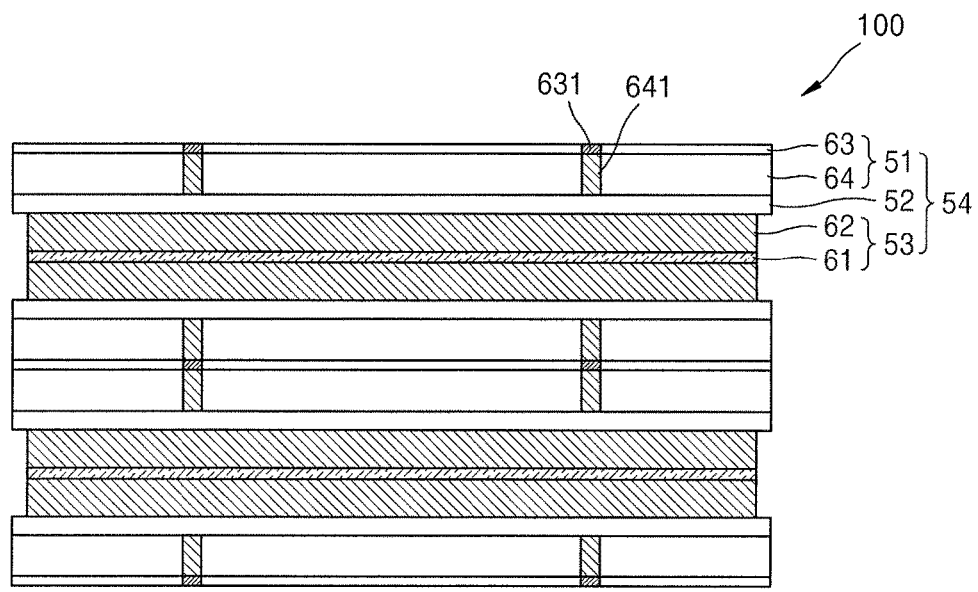
FIG. 4 illustrates a schematic view of a structure of a stack-type electrode assembly according to an embodiment.

FIG. 4 illustrates a schematic view of a structure of a stack-type electrode assembly 100 according to an embodiment.

As shown in FIG. 4, the stack-type electrode assembly 100 may include a unit electrode assembly 54 including a first electrode 51, an electrolyte membrane 52, and a second electrode 53 that are sequentially stacked in this stated order, wherein a plurality of the unit electrode assemblies 54 may be sequentially and repeatedly stacked in the stack-type electrode assembly 100. For example, the first electrode 51 may be a positive electrode, and the second electrode 53 may be a negative electrode. In some implementations, the first electrode 51 may be a negative electrode, and the second electrode 53 may be a positive electrode.

The first electrode 51 may include a first electrode substrate 63 that is coated with an electrolyte and a first electrode active material layer 64 that is coated with an electrolyte disposed on the first electrode substrate 63 that is coated with an electrolyte, wherein a first electrode substrate 631 that is not coated with an electrolyte and a first electrode active material layer 641 that is not coated with an electrolyte are connected to least a part of each of the first electrode substrate 63 that is coated with an electrolyte and the first electrode active material layer 64 that is coated with an electrolyte. The second electrode 53 may include a second electrode substrate 61 and a second electrode active material layer 62 on the second electrode substrate 61.

The stack-type electrode assembly according to an embodiment may have a plurality of layers of unit electrode assemblies that are repeatedly stacked, each of unit electrode assemblies including a first electrode, an electrolyte membrane, and a second electrode sequentially disposed in this stated order.

In the stack-type electrode assembly, both surfaces of the second electrode 53 located in the middle part of the stack may have an electrolyte membrane 52 disposed thereon. An electrode membrane 52 may be omitted from an exposed lower-facing or upper facing surface of a second electrode 53 disposed respectively at an lowermost or uppermost part of the stack.

According to another embodiment, a lithium battery may include the electrode assembly described above.

Figure 3:
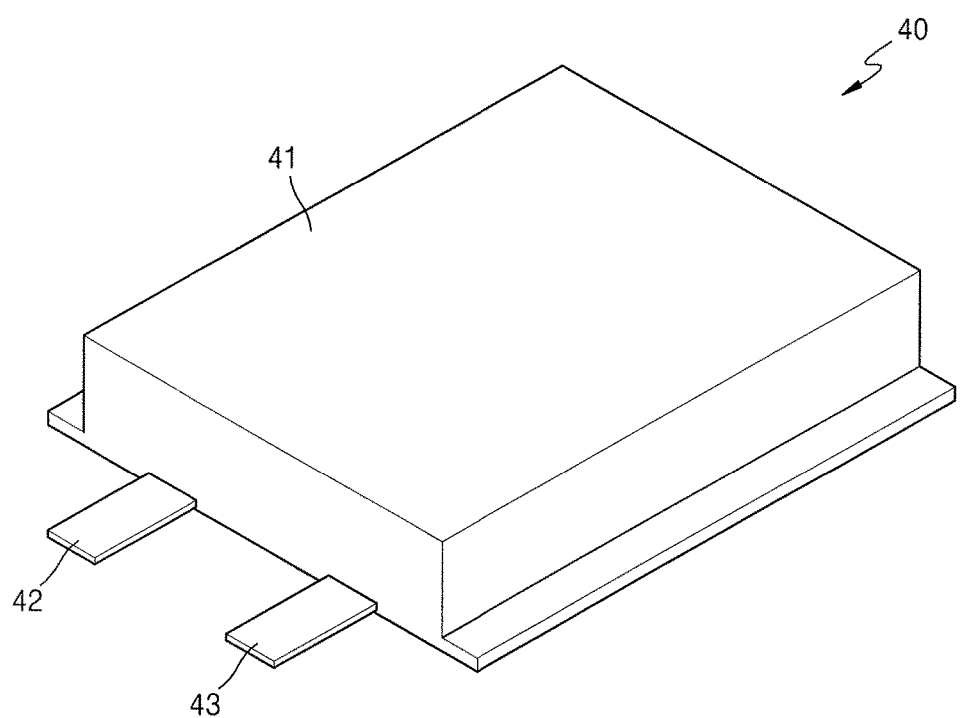
FIG. 3 illustrates a perspective view of a structure of a lithium battery according to an embodiment.

FIG. 3 is a perspective view of a structure of a lithium battery 40 according to an embodiment.

As shown in FIG. 3, the lithium battery 40 may be prepared by accommodating the electrode assembly, e.g., the stack-type electrode assembly 100, in a battery case 41 and thermally welding edge portions of an upper case and a lower case at a reduced pressure to seal the battery case 41. A first tab portion 42 and a second tab portion 43 may be exposed outside the battery case 41.

According to another embodiment, a method manufacturing an electrode assembly includes performing a punching process on at least one lateral side of a second electrode substrate having a second electrode active material layer by using a mold for forming at least one groove, to prepare a second electrode, coating and drying a composition for forming an electrolyte membrane on the second electrode to provide an electrolyte membrane, stacking a first electrode having a first electrode active material layer onto the second electrode having the electrolyte membrane, and performing a cutting process in a shape of the electrode assembly to prepare the electrode assembly.

For example, a lithium battery including the electrode assembly may be prepared as follows.

First, a positive electrode may be prepared. The positive electrode may be one of a variety of types.

For example, a positive electrode active material, a conducting agent, a binder, and a solvent may be mixed to prepare a positive electrode active material composition. In some embodiments, the positive electrode active material composition may be directly coated onto a metallic current collector to prepare a positive electrode plate. In some embodiments, the positive electrode active material composition may be cast onto a separate support to form a positive electrode active material film, which may then be separated from the support and laminated onto a metallic current collector to prepare a positive electrode.

A suitable positive electrode active material may be used. For example, the positive electrode active material may be a lithium-containing metal oxide. In some embodiments, the positive electrode active material may be a compound represented by one of the following formulae:

$Li_aA_{1-b}B'_bD'_2$ (where $0.90\leq a\leq 1.8$ and $0\leq b\leq 0.5$); $Li_aE_{1-b}B'_bO_{2-c}D'_c$ (where $0.90\leq a\leq 1.8$, $0\leq b\leq 0.5$, and $0\leq c\leq 0.05$); $LiE_{2-b}B'_bO_{4-c}D'_c$ (where $0\leq b\leq 0.5$ and $0\leq c\leq 0.05$); $Li_aNi_{1-b-c}Co_bB'_cD'_\alpha$ (where $0.90\leq a\leq 1.8$, $0\leq b\leq 0.5$, $0\leq c\leq 0.05$, and $0<\alpha\leq2$); $Li_aNi_{1-b-c}Co_bB'_cO_{2-\alpha}F_\alpha$ (where $0.90\leq a\leq1.8$, $0\leq b\leq0.5$, $0\leq c\leq0.05$, and $0<\alpha<2$); $Li_aNi_{1-b-c}Co_bB'_cO_{2-\alpha}F'_2$ (where $0.90\leq a\leq1.8$, $0\leq b\leq0.5$, $0\leq c\leq0.05$, and $0<\alpha<2$); $Li_aNi_{1-b-c}Mn_bB'_cD'_\alpha$ (where $0.90\leq a\leq1.8$, $0\leq b\leq0.5$, $0\leq c\leq0.05$, and $0<\alpha\leq2$); $Li_aNi_{1-b-c}Mn_bB'_cO_{2-\alpha}F_\alpha$ (where $0.90\leq a\leq1.8$, $0\leq b\leq0.5$, $0\leq c\leq0.05$, and $0<\alpha<2$); $Li_aNi_{1-b-c}Mn_bB'_cO_{2-\alpha}F'_2$ (where $0.90\leq a\leq1.8$, $0\leq b\leq0.5$, $0\leq c\leq0.05$, and $0<\alpha<2$); $Li_aNi_bE_cG_dO_2$ (where $0.90\leq a\leq1.8$, $0\leq b\leq0.9$, $0\leq c\leq0.5$, and $0.001\leq d\leq0.1$); $Li_aNi_bCo_cMn_dG_eO_2$ (where $0.90\leq a\leq1.8$, $0\leq b\leq0.9$, $0\leq c\leq0.5$, $0\leq d\leq0.5$, and $0.001\leq e\leq0.1$); $Li_aNiG_bO_2$ (where $0.90\leq a\leq1.8$ and $0.001\leq b\leq0.1$); $Li_aCoG_bO_2$ (where $0.90\leq a\leq1.8$ and $0.001\leq b\leq0.1$); $Li_aMnG_bO_2$ (where $0.90\leq a\leq1.8$ and $0.001\leq b\leq0.1$); $Li_aMn_2G_bO_4$ (where $0.90\leq a\leq1.8$ and $0.001\leq b\leq0.1$); $QO_2$; $QS_2$; $LiQS_2$; $V_2O_5$; $LiV_2O_5$; $LiI'O_2$; $LiNiVO_4$; $Li_{(3-f)}J_2(PO_4)_3$ (where $0\leq f\leq2$); $Li_{(3-f)}Fe_2(PO_4)_3$ (where $0\leq f\leq2$); and $LiFePO_4$.

In the formulae above, A may be selected from nickel (Ni), cobalt (Co), manganese (Mn), and combinations thereof; B' may be selected from aluminum (Al), nickel (Ni), cobalt (Co), manganese (Mn), chromium (Cr), iron (Fe), magnesium (Mg), strontium (Sr), vanadium (V), a rare earth element, and combinations thereof; D' may be selected from oxygen (O), fluorine (F), sulfur (S), phosphorus (P), and combinations thereof; E may be selected from cobalt (Co), manganese (Mn), and combinations thereof; F' may be selected from fluorine (F), sulfur (S), phosphorus (P), and combinations thereof; G may be selected from aluminum (Al), chromium (Cr), manganese (Mn), iron (Fe), magnesium (Mg), lanthanum (La), cerium (Ce), strontium (Sr), vanadium (V), and combinations thereof; Q is selected from titanium (Ti), molybdenum (Mo), manganese (Mn), and combinations thereof; I' is selected from chromium (Cr), vanadium (V), iron (Fe), scandium (Sc), yttrium (Y), and combinations thereof; and J may be selected from vanadium (V), chromium (Cr), manganese (Mn), cobalt (Co), nickel (Ni), copper (Cu), and combinations thereof.

For example, the positive electrode active material may include at least one selected from $LiCoO_2$, $LiMn_xO_{2x}$ (where x=1 or 2), $LiNi_{1-x}Mn_xO_{2x}$ (where $0<x<1$), $LiNi_{1-x-y}Co_xMn_yO_2$ (where $0\leq x\leq0.5$ and $0\leq y\leq0.5$), and $LiFePO_4$.

The compounds listed above as positive electrode active materials may have a surface coating layer (hereinafter, also referred to as "coating layer"). In some implementations, a mixture of a compound without a coating layer and a compound having a coating layer, the compounds being selected from the compounds listed above, may be used. In some embodiments, the coating layer may include at least one compound of a coating element selected from the group of oxide, hydroxide, oxyhydroxide, oxycarbonate, and hydroxycarbonate of the coating element. In some embodiments, the compounds for the coating layer may be amorphous or crystalline. In some embodiments, the coating element for the coating layer may be magnesium (Mg), aluminum (Al), cobalt (Co), potassium (K), sodium (Na), calcium (Ca), silicon (Si), titanium (Ti), vanadium (V), tin (Sn), germanium (Ge), gallium (Ga), boron (B), arsenic (As), zirconium (Zr), or a mixture thereof. In some embodiments, the coating layer may be formed using a suitable method that does not adversely affect the physical properties of the positive electrode active material when a compound of the coating element is used. The coating layer may be formed by a suitable coating method, for example, a spray coating method, or a dipping method.

A suitable conducting agent may be used. For example, in some embodiments, the conducting agent may be carbon black or graphite particulates, as examples. An amount of the conducting agent may be appropriately controlled. For example, a weight ratio of the positive electrode active material and the conducting agent may be in a range of about 99:1 to about 90:10.

A suitable binding agent may be used. Examples of the binder may include a vinylidene fluoride/hexafluoropropylene copolymer, polyvinylidene fluoride (PVDF), polyacrylonitrile, polymethylmethacrylate, polytetrafluoroethylene, mixtures thereof, and a styrene butadiene rubber polymer The binder may be added in an amount in a range of about 1 part to about 50 parts by weight based on 100 parts by weight of the positive electrode active material. For example, the binder may be added in an amount in a range of about 1 part to about 30 parts by weight, or, for example, about 1 part to about 20 parts by weight or about 1 part to about 15 parts by weight, based on 100 parts by weight of the positive electrode active material.

A suitable solvent may be used. Examples of the solvent may include N-methyl-pyrrolidone, acetone, and water An amount of the solvent may be in a range of about 1 part to about 40 parts by weight based on 100 parts by weight of the positive electrode active material. When the amount of the solvent is within this range, the active material layer may be easily formed.

Amounts of the positive electrode active material, the conducting agent, the binder, and the solvent may be in ranges that are generally used in lithium batteries. At least one of the conducting agent, the binder, and the solvent may be omitted depending on the use and the structure of the lithium battery.

A positive electrode metallic current collector may be a substrate or a film formed of, for example, stainless steel, aluminum, iron, nickel, titanium, or carbon. A shape of the positive electrode current collector may be a rectangle, a circle, or a shape appropriate for a porous 3-dimensional metal plate. The positive electrode active material layer may be formed on one surface or two surfaces of the current collector.

Next, a negative electrode is prepared.

For example, a negative electrode active material, a conducting agent, a binder, and a solvent may be mixed to prepare a negative electrode active material composition. In some embodiments, the negative electrode active material composition may be directly coated onto a metallic current collector to prepare a negative electrode plate. In some embodiments, the negative electrode active material composition may be cast onto a separate support to form a negative electrode active material film, which may then be separated from the support and laminated onto a metallic current collector to prepare a negative electrode.

A suitable negative electrode active material may be used. For example, the negative electrode active material may be one or more selected from a lithium metal, a metal alloyable with lithium, a transition metal oxide, a non-transition metal oxide, and a carbon-based material.

For example, the metal alloyable with lithium may be Si, Sn, Al, Ge, Pb, Bi, Sb, a Si—Y' alloy (where Y' is an alkali metal, an alkali earth metal, a Group XIII element, a Group XIV element, a transition metal, a rare earth element, or a combination thereof, and Y' is not Si), and a Sn—Y' alloy (where Y' is an alkali metal, an alkali earth metal, a Group XIII element, a Group XIV element, a transition metal, a rare earth element, or a combination thereof, and Y' is not Sn). In some embodiments, Y' may be magnesium (Mg), calcium (Ca), strontium (Sr), barium (Ba), radium (Ra), scandium (Sc), yttrium (Y), titanium (Ti), zirconium (Zr), hafnium (Hf), rutherfordium (Rf), vanadium (V), niobium (Nb), tantalum (Ta), dubnium (Db), chromium (Cr), molybdenum (Mo), tungsten (W), seaborgium (Sg), technetium (Tc), rhenium (Re), bohrium (Bh), iron (Fe), lead (Pb), ruthenium (Ru), osmium (Os), hassium (Hs), rhodium (Rh), iridium (Ir), palladium (Pd), platinum (Pt), copper (Cu), silver (Ag), gold (Au), zinc (Zn), cadmium (Cd), boron (B), aluminum (Al), gallium (Ga), tin (Sn), indium (In), germanium (Ge), phosphorus (P), arsenic (As), antimony (Sb), bismuth (Bi), sulfur (S), selenium (Se), tellurium (Te), or polonium (Po), or combinations thereof.

Examples of the transition metal oxide may include a lithium titanium oxide, a vanadium oxide, and a lithium vanadium oxide.

Examples of the non-transition metal oxide may include $SnO_2$ and $SiO_c$ (where $0<x<2$).

The carbon-based material may be crystalline carbon, amorphous carbon, or a mixture thereof. Examples of the crystalline carbon may include natural graphite and artificial graphite, each of which has an amorphous shape, a plate shape, a flake shape, a spherical shape, or a fiber shape. Examples of the amorphous carbon may include soft carbon (low-temperature calcined carbon), hard carbon, mesophase pitch carbide, and calcined cokes.

The conducting agent and the binder used in preparation of the negative electrode active material composition may be the same with those used in preparation of the positive electrode active material composition.

Amounts of the negative electrode active material, the conducting agent, the binder, and the solvent may be at a suitable level. At least one of the conducting agent, the binder, and the solvent may be omitted depending on the use and the structure of the lithium battery.

A negative electrode metallic current collector may be a substrate or a foil formed of, for example, stainless steel, copper, nickel, or carbon. A shape of the negative electrode current collector may be a rectangle, a circle, or a shape appropriate for a porous 3-dimensional metal plate. The negative electrode active material layer may be formed on one surface or two surfaces of the current collector.

Figure 5:
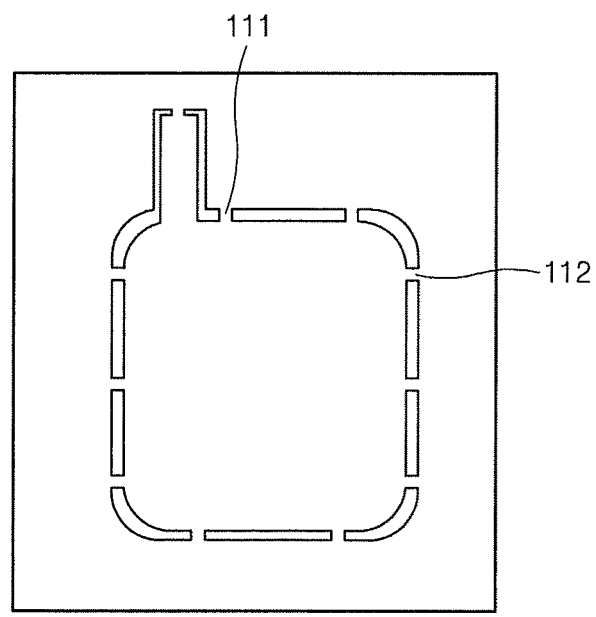
FIG. 5 illustrates a schematic view of a punching processed electrode according to an embodiment.

The negative electrode may be punch processed by using a mold to form at least one groove in one lateral side. For example, the punching process may be performed using the shape shown in FIG. 5. Referring to FIG. 5, the shape of the mold has 2 grooves (111) in each of short-side edges and 3 grooves (112) in each of long-side edges. The shape of the mold has 10 grooves in total.

Figure 6:
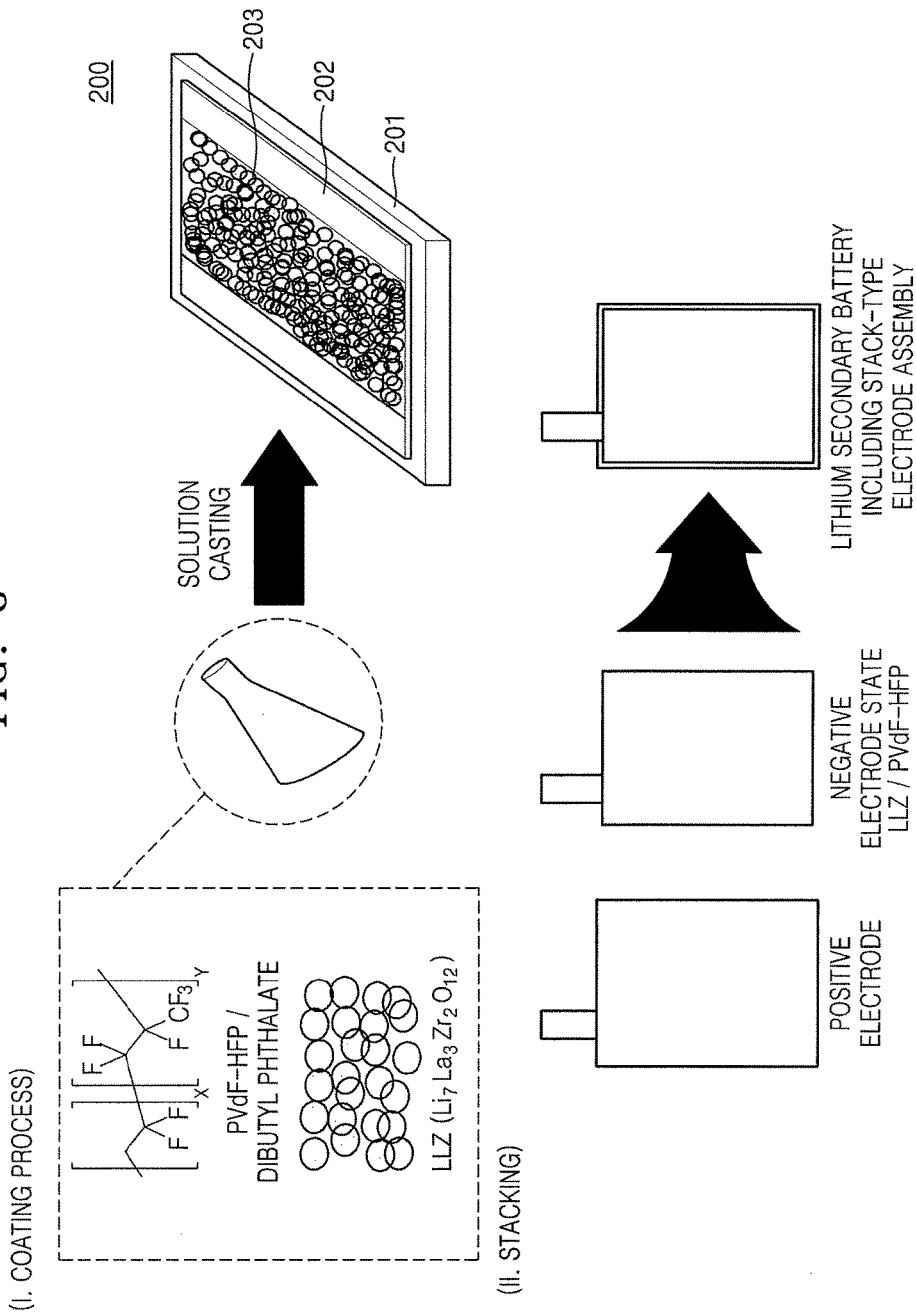
FIG. 6 illustrates a flowchart that illustrates a coating process (disposing an electrolyte membrane) and a stacking process (manufacturing an electrode assembly) among a method of manufacturing an electrode assembly according to an embodiment.

FIG. 6 illustrates a flowchart that illustrates a coating process (disposing an electrolyte membrane) and a stacking process (manufacturing an electrode assembly) among a method of manufacturing an electrode assembly according to an embodiment.

Next, referring to I. Coating Process, illustrated in FIG. 6, an electrolyte membrane is prepared.

In order to prepare an electrolyte membrane, a composition for an electrolyte membrane may be prepared. The composition may include a mixture including a solvent, a polymer and a lithium ion conductive inorganic material.

The solvent may be an organic solvent such as tetrahydrofuran (THF, ≥99%, available from Sigma Aldrich).

For example, the composition for an electrolyte membrane may be prepared by mixing the polymer dissolved in the solvent with the lithium ion conductive inorganic material.

A mixing weight ratio of the polymer and the lithium ion conductive inorganic material may be in a range of about 97:3 to about 30:70. For example, a mixing weight ratio of the polymer and the lithium ion conductive inorganic material may be about 4:6. When the mixing weight ratio of the polymer and the lithium ion conductive inorganic material in the composition for an electrolyte membrane is within this range, the electrolyte membrane may have a high lithium ion conductivity and high electrochemical stability.

The lithium ion conductive inorganic material has ion conductivity of ions that are carriers related to a battery reaction. A material that is not dissociated within a room temperature range (from about 5° C. or higher to about 35° C. or lower) in air may be used as the lithium ion conductive inorganic material. The lithium ion conductive inorganic material may be, for example, an oxide-based electrolyte such as a perovskite-type oxide, a NASICON-type oxide, a LISICON-type oxide, or a garnet type oxide. For example, a garnet-type oxide may be used as the lithium ion conductive inorganic material.

Examples of the perovskite-type oxide may include a Li—La—Ti-based perovskite-type oxide that is represented by $Li_aLa_{1-a}TiO_3$, a Li—La—Ta-based perovskite-type oxide that is represented by $Li_bLa_{1-b}TaO_3$, or a Li—La—Nb-based perovskite-type oxide that is represented by $Li_cLa_{1-c}NbO_3$ (where $0<a<1$, $0<b<1$, and $0<c<1$).

Examples of the NASICON-type oxide may include an oxide represented by $Li_mX_nY''_oP_pO_q$ (where X is at least one element selected from B, Al, Ga, In, C, Si, Ge, Sn, Sb, and Se; Y'' is at least one element selected from Ti, Zr, Ge, In, Ga, Sn, and Al; $0 \leq g \leq 1$; and m, n, o, p and q are a positive integer), which includes crystals represented by $Li_{1+g}Al_gTi_{2-g}(PO_4)_3$, as main crystals.

Examples of the LISICON-type oxide may include an oxide represented by $Li_4XO_4$—$Li_3Y''O_4$ (where X is at least one element selected from Si, Ge, and Ti; and Y''' is at least one element selected from P, As, and V).

Examples of the garnet-type oxide may include a Li—La—Zr-based oxide that is represented by $Li_7La_3Zr_2O_{12}$.

The composition for an electrolyte membrane (203) may be coated and dried on the negative electrode (201) to provide the electrolyte membrane (202). The coating method may be a solution casting method as described above. The solution casting method may allow even disposition of the electrolyte membrane on the negative electrode.

Next, referring to II. Stacking, illustrated in FIG. 6, the electrode assembly may be prepared by stacking the positive electrode on the negative electrode having the electrolyte membrane formed thereon (200); and cutting in a shape of the electrode assembly. The electrode assembly may be accommodated in a battery case, and then edge portions of an upper case and a lower case may be thermally welded at a reduced pressure to seal the battery case, thereby completing manufacture of a lithium battery. The lithium battery may be a lithium secondary battery. The battery case may be a pouch-type battery case.

A plurality of the battery assemblies may be stacked to form a battery pack, which may be used in any device that requires high capacity and high output, for example, in a laptop computer, a smart phone, or an electric vehicle (EV).

The lithium secondary battery may have improved lifetime characteristics and high rate characteristics, and thus may be used in an electric vehicle (EV), for example, in a hybrid vehicle such as a plug-in hybrid electric vehicle (PHEV). The lithium battery may be applicable to the high-power storage field. For example, the lithium battery may be used in an electric bicycle or a power tool.

The following Examples and Comparative Examples are provided in order to highlight characteristics of one or more embodiments, but it will be understood that the Examples and Comparative Examples are not to be construed as limiting the scope of the embodiments, nor are the Comparative Examples to be construed as being outside the scope of the embodiments. Further, it will be understood that the embodiments are not limited to the particular details described in the Examples and Comparative Examples.

EXAMPLE

Manufacture of Lithium Secondary Battery

Example 1: Manufacture of Lithium Secondary Battery 1.1 Preparation of Positive Electrode 97.5 wt % of a positive electrode active material, $LiCoO_2$, (available from Umicore), 1 wt % of a conducting agent, carbon black (ECP, available from Lion), and 1.5 wt % of a binder, PVdF (Solef, available from Solvay) were added to a solvent, N-methyl-pyrrolidone, to prepare a mixture. The mixture was stirred for 30 minutes using a mechanical stirrer to obtain a positive electrode active material composition.

The positive electrode active material composition was coated onto an aluminum current collector at a thickness of about 100 μm, where a thickness of the aluminum current collector was a thickness of about 15 μm. The resultant was dried in a hot-air dryer at 100° C. for 0.5 hour, dried once more at 120° C. for 4 hours in vacuum, and then roll-pressed to prepare a positive electrode in a size of 2.5 cm×3.5 cm having a positive electrode active material layer formed on the aluminum current collector.

1.2 Preparation of Negative Electrode 98 wt % of a graphite powder (available from Shanshan Tech., Shanghai) and 2 wt % of a binder, SBR (MB400-B, available from Zeon) were added to a solvent, N-methyl-pyrrolidone, to prepare a mixture. The mixture was stirred for 60 minutes using a mechanical stirrer to obtain a negative electrode active material composition.

The positive negative active material composition was coated onto a copper current collector at a thickness of about 100 μm, where a thickness of the copper current collector was a thickness of about 12 μm. The resultant was dried in a hot-air dryer at 100° C. for 0.5 hour, dried once more at 120° C. for 4 hours in vacuum, and then roll-pressed to prepare a negative electrode having a negative electrode active material layer formed on the copper current collector.

The negative electrode having the negative electrode active material layer was punch-processed such that a non-coated portion including 8 grooves, each having a width of about 1 mm, was formed in each of short-side edges and long-side edges.

1.3 Disposition of Electrolyte Membrane

As starting materials, $Li_2CO_3$, as a Li precursor; $La_2O_3$, as a La precursor, and $ZrO_2$, as a Zr precursor were mixed at a stoichiometrically appropriate molar ratio to obtain $Li_7La_3Zr_2O_{12}$.

6 wt % of $Li_7La_3Zr_2O_{12}$ thus obtained and lithium bis(trifluoromethansulfonyl)imide ($Li(CF_3SO_2)_2N$: LiTFSI) ([EO/Li]=20) were added to 4 wt % of PEO dissolved in anhydrous THF (≥99%, available from Sigma Aldrich, number average molecular weight (Mn)=1,000,000 Dalton) (1000 kg/mol) and mixed to prepare a composition for an electrolyte membrane.

The composition for an electrolyte membrane was coated onto the negative electrode having the negative electrode active material layer at a thickness of about 45 μm. The resultant was placed in an argon glove box to slowly evaporate THF for 24 hours at about 25° C., and was dried in vacuum at 60° C. for 24 hours to provide an electrolyte membrane on the negative electrode.

1.4 Manufacture of Electrode Assembly

The positive electrode prepared in 1.1 was stacked and cut on the negative electrode prepared in 1.2 and the electrolyte membrane prepared in 1.3 disposed on the negative electrode by using a cutter to manufacture an electrode assembly having a non-coated portion including 8 grooves, each having a width of about 1 mm, formed in each of short-side edges and long-side edges of the copper current collector, as a negative electrode substrate. An example of the stack-type electrode assembly is shown in FIG. 4. Here, a cross-sectional area of the non-coated portion was about 6% based on the total area of the negative electrode.

1.5 Manufacture of Lithium Secondary Battery

The electrode assembly prepared in 1.4 was accommodated in a pouch-type case, and edges of an upper case and a lower case of the pouch-type case were thermally welded at a reduced pressure to seal the pouch-type case, thereby completing manufacture of a lithium secondary battery.

Example 2: Manufacture of Lithium Secondary Battery

A lithium secondary battery was manufactured in the same manner as in the manufacture of the lithium secondary battery of Example 1, except that a negative electrode was punch-processed to have a non-coated portion including 2 grooves, each having a width of about 1 mm, in each of short-side edges and 3 grooves, each having a width of about 1 mm, in each of long-side edges such that the non-coated portion had 2 grooves, each having a width of about 1 mm, in each of the short-side edges and 3 grooves, each having a width of about 1 mm, in each of the long-side edges of the copper current collector, as a negative electrode substrate, instead of preparing the negative electrode according to Example 1 that was punch-processed to have a non-coated portion including 8 grooves, each having a width of about 1 mm, formed in each of short-side edges and long-side edges, as in the preparation of the negative electrode of 1.2. Here, a cross-sectional area of the non-coated portion was about 17% based on the total area of the negative electrode.

Comparative Example 1: Manufacture of Lithium Secondary Battery

A lithium secondary battery was manufactured in the same manner as in Example 1, except that the negative electrode was not punch-processed, as in the preparation of the negative electrode of 1.2.

Evaluation of Battery Characteristics

Evaluation Example 1: Adhesive Strength Evaluation

An adhesive strength test evaluating adhesive strength between a negative electrode and an electrolyte membrane was performed on the negative electrodes having a negative electrode active material layer of the lithium secondary batteries prepared in Examples 1 and 2 and Comparative Example 1.

For the adhesive strength evaluation, the negative electrode active material layer formed on the copper current collector, as a negative electrode substrate, and the electrolyte membrane coated on the negative electrode having a negative electrode active material layer in each of the lithium secondary batteries prepared in Examples 1 and 2 and Comparative Example 1 were each connected to a zig, and a force (N/mm), i.e., an adhesive strength with respect to the negative electrode substrate, needed to detach the electrolyte membrane from the negative electrode having a negative electrode active material layer was measured by performing a 180 degree peel-off test using H5kT (available from TiniusOlsen). The adhesive strength evaluation test was repeated 5 times, and an average value of the measured values was calculated. The results are shown in Table 1.

TABLE 1

|  | Adhesive strength (N/mm) |
| --- | --- |
| Example 1 | 0.077 |
| Example 2 | 0.086 |
| Comparative Example 1 | 0.028 |

As shown in Table 1, the adhesive strength of the lithium secondary batteries prepared in Examples 1 and 2 to the negative electrode substrate was at least three times better than that of the lithium secondary battery prepared in Comparative Example 1.

Evaluation Example 2: Evaluation of Defect Rate Caused by Shorts

Defect rates caused by shorts of the lithium secondary batteries prepared in Examples 1 and 2 and Comparative Example 1 were evaluated.

In order to evaluate defect rates caused by shorts, 20 electrode assemblies that constitute each of the lithium secondary batteries were stacked, and the defect rate according to coating or non-coating of the electrolyte membrane disposed on the negative electrode substrate having a negative electrode active material layer was measured by using a direct current resistance measuring method of a cell. The defect rate was obtained using Equation 1 below. The results are shown in Table 2.

Defect rate (%)=[(the total number of cells determined as having defects/the total number of manufactured cells)×100]  <Equation 1>

TABLE 2

|  | Defect rate (%) |
| --- | --- |
| Example 1 | 10 |
| Example 2 | 15 |
| Comparative Example 1 | 90 |

As shown in Table 2, it may be conformed that defect rates of the lithium secondary batteries prepared in Examples 1 and 2 improved at least about 80% compared to that of the lithium secondary battery prepared in Comparative Example 1.

As described above, according to one or more embodiments, a lithium battery may have a non-coated portion in at least one lateral side of a first electrode or a second electrode. The at least one non-coated portion of the first electrode or the second electrode includes at least one groove that is formed parallel to a thickness direction of the first electrode or the second electrode. Thus, the lithium battery may have an improved adhesive strength between a negative electrode substrate and an electrolyte membrane and an improve electrical stability.

By way of summation and review, in order to manufacture a electrochemically stable lithium secondary battery, an electrolyte membrane (i.e., a solid electrolyte) may be used as an electrolyte. For example, such an electrolyte membrane may replace a separator and may provide improved safety.

However, when a general electrolyte membrane replaces a separator, electrical shorts may occur during the manufacturing of the lithium secondary battery.

For example, when the electrolyte membrane is coated onto an electrode plate (a positive electrode/a negative electrode), a punching process may be performed after the coating process. An electrode substrate surface of the electrode substrate cut by the punching process substrate may be exposed as it is. Shorts may occur on the electrode substrate surface as a plurality of electrode substrate surfaces contact each other while welding the tab portion, at which the current is collected, after a stacking process for the manufacture of a lithium battery.

In order to address the problem of electrical shorts occurring during manufacture, the punching process may be performed first, and then the electrolyte membrane may be coated. However, in such a method, the electrode plate may become twisted while drying the electrode plate. Thus the electrolyte membrane may not be coated on both surfaces of the electrode plate.

Therefore, there is demand for an electrode assembly with improved electrical stability by having a novel structure and a lithium secondary battery including the electrode assembly.

One or more embodiments provide an electrode assembly having a novel structure. One or more embodiments include a lithium battery including the electrode assembly. One or more embodiments include a method of manufacturing the electrode assembly.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope thereof as set forth in the following claims.

What is claimed is:
1. An electrode assembly, comprising:
a first electrode, the first electrode having a long side edge extending in a first direction, a short side edge extending in a second direction orthogonal to the first direction, and a surface having a major plane that extends parallel to the first and second directions;
a second electrode, the second electrode having a long side edge extending in the first direction, a short side edge extending in the second direction, and a surface having a major plane that extends parallel to the first and second directions; and
an electrolyte membrane between the first electrode and the second electrode, the first electrode, the electrolyte membrane, and the second electrode being sequentially stacked in a third direction orthogonal to the first and second directions, wherein:

each of the first electrode and the second electrode includes:
an electrode active material layer,
a tab portion, and
a non-coated portion, the non-coated portion being located at at least one of the long side edge and the short side edge of the first electrode or the second electrode, and the electrode assembly includes a groove, the groove being in the non-coated portion of at least one of the first electrode and the second electrode, the groove extending parallel to the third direction so as to completely penetrate upper and lower surfaces of the first electrode or the second electrode at the long side edge or the short side edge, the groove reducing an area of the non-coated portion.

2. The electrode assembly as claimed in claim 1, wherein a cross-section of the groove is a rectangle in plan view.

3. The electrode assembly as claimed in claim 1, wherein a cross-sectional area of the groove reduces the area of the first electrode or the second electrode by about 0.1% to about 20% relative to the total area of the first electrode or the second electrode.

4. The electrode assembly as claimed in claim 1, wherein the at least one groove is present in a range of 1 to 6 grooves per 600 mm unit length of the at least one lateral side.

5. The electrode assembly as claimed in claim 1, wherein a width of the groove is in a range of about 0.1 mm to about 10 mm.

6. The electrode assembly as claimed in claim 1, wherein:
the first electrode and the second electrode each have a rectangular shape that includes a short-side and a long-side, and
the second electrode includes at least two grooves in a lateral edge of the short-side and at least two grooves in a lateral edge of the long-side.

7. The electrode assembly as claimed in claim 1, wherein the tab portion includes a non-coated portion comprising grooves.

8. The electrode assembly as claimed in claim 1, wherein the electrolyte membrane is an organic-inorganic hybrid electrolyte membrane that includes a polymer and a lithium ion conductive inorganic material.

9. The electrode assembly as claimed in claim 8, wherein the polymer is at least one selected from polyethyleneoxide (PEO), polypropyleneoxide (PPO), polybutyleneoxide (PBO), polysiloxane, polyethyleneglycol (PEG), polypropyleneglycol (PPG), PEO grafted polymethylmethacrylate (PEO grafted PMMA), PPO grafted PMMA, PBO grafted PMMA, polysiloxane grafted PMMA, PEG grafted PMMA, PPG grafted PMMA, a diblock copolymer of PEO and polystyrene, a triblock copolymer of PEO, polystyrene, and PEO, a triblock copolymer of polystyrene, PEO, and polystyrene, cross-linked PEO, acrylate-based cross-linked PEO, urea-based cross-linked PEO, and urethane-based cross-linked PEO.

10. The electrode assembly as claimed in claim 8, wherein the lithium ion conductive inorganic material includes a garnet oxide.

11. The electrode assembly as claimed in claim 10, wherein the garnet oxide is represented by Formula 1:

$$L_{5+x+2y}(D_y,E_{3-y})(Me_z,M_{2-z})O_d$$ <Formula 1> wherein, in Formula 1,
L is one or more selected from Li, Na, Mg, Ca, K, and H;
D is K, Rb, or Cs;
E is La;
Me is one or more selected from Ta, Nb, Y, Sc, W, Mo, Sb, Bi, Hf, V, Ge, Si, Al, Ga, Ti, Co, In, Zn, and Cr;
M is Zr, Ta, Bi, Sb, or Nb;
$0<x+2y\leq3$, $0\leq y\leq0.5$, $0\leq z<2$, and $0<d\leq12$; and
some or all oxygens are substitutable with one or more selected from pentavalent, hexavalent, and heptavalent anions.

12. The electrode assembly as claimed in claim 8, wherein the organic-inorganic hybrid electrolyte membrane further includes a lithium salt.

13. The electrode assembly as claimed in claim 12, wherein the lithium salt includes at least one selected from LiSCN, LiN(CN)$_2$, LiClO$_4$, LiBF$_4$, LiAsF$_6$, LiPF$_6$, LiCF$_3$SO$_3$, Li(CF$_3$SO$_2$)$_2$N, Li(CF$_3$SO$_2$)$_3$C, LiN(SO$_2$F)$_2$, LiN(SO$_2$CF$_3$)$_2$, LiN(SO$_2$CF$_2$CF$_3$)$_2$, LiSbF$_6$, LiPF$_3$(CF$_2$CF$_3$)$_3$, LiPF$_3$(CF$_3$)$_3$, and LiB(C$_2$O$_4$)$_2$.

14. The electrode assembly as claimed in claim 1, wherein the electrode assembly is a stack-type electrode assembly.

15. A lithium battery comprising the electrode assembly as claimed in claim 1.

16. A method of manufacturing an electrode assembly, the method comprising:
preparing a second electrode, the second electrode having a long side edge extending in a first direction, a short side edge extending in a second direction orthogonal to the first direction, and a surface having a major plane that extends parallel to the first and second directions, the second electrode having at least one groove in at least one of the short side edge and the long side edge, the groove extending in a third direction orthogonal to the first and second directions, the groove being formed to completely penetrate upper and lower surfaces of the second electrode, the groove reducing an area of the second electrode;
coating and drying a composition for forming an electrolyte membrane on the surface of the second electrode to provide an electrolyte membrane; and
stacking a first electrode having a first electrode active material layer on the second electrode having the electrolyte membrane.

17. The method as claimed in claim 16, wherein the composition for forming an electrolyte membrane is a mixture that includes a solvent, a polymer, and a lithium ion conductive inorganic material.

18. The method as claimed in claim 16, wherein a mixing weight ratio of the polymer and the lithium ion conductive inorganic material is in a range of about 97:3 to about 30:70.

19. A battery, comprising:
a first second electrode;
a first solid electrolyte membrane;
a first electrode, the first second electrode and the first electrode being disposed with the first solid electrolyte membrane interposed therebetween and in contact therewith;
a second solid electrolyte membrane in contact with the first electrode; and
a second second electrode in contact with the second solid electrolyte membrane, the second second electrode and the second solid electrolyte membrane being disposed to form a stack that includes the first second electrode, the first solid electrolyte membrane, the first electrode, the second solid electrolyte membrane, and the second second electrode in the stated sequence, wherein the first second electrode and the second second electrode each include a top surface, a bottom surface opposite to said top surface, with four peripheral side surfaces interposed therebetween said top and bottom surfaces, and a groove on one of said peripheral side surfaces, the groove extending the thickness of the respective electrode and having a base that is on one of said peripheral surfaces and located between the top and bottom surface.

20. The battery as claimed in claim 19, wherein the groove in the first second electrode is vertically aligned with the groove in the second second electrode, and the first electrode does not have a groove aligned with the grooves in the first and second second electrodes.

* * * * *